United States Patent [19]

Tsuzuki et al.

[11] 4,435,721

[45] Mar. 6, 1984

[54] PRINT HEAD FOR AN ON-DEMAND TYPE INK-JET PRINTER

[75] Inventors: Mitsuo Tsuzuki; Michihisa Suga, both of Tokyo, Japan

[73] Assignee: Nippon Electric Co., Ltd., Tokyo, Japan

[21] Appl. No.: 375,147

[22] Filed: May 5, 1982

[30] Foreign Application Priority Data

May 6, 1981 [JP] Japan ................................ 56-67966

[51] Int. Cl.[3] ............................................ G01D 15/18

[52] U.S. Cl. ................................................ 346/140 R

[58] Field of Search ................................ 346/140 PD

[56] References Cited

U.S. PATENT DOCUMENTS 3,848,118 11/1974 Rittberg ....................... 346/140 PD 3,974,508 8/1976 Blumenthal .................. 346/140 PD 4,326,205 4/1982 Fischbeck et al. ........... 346/140 PD

FOREIGN PATENT DOCUMENTS 2657586 6/1978 Fed. Rep. of Germany ...... 346/140 PD

*Primary Examiner*—George H. Miller, Jr.

*Attorney, Agent, or Firm*—Sughrue, Mion, Zinn, Macpeak and Seas

[57] ABSTRACT

A print head for an on-demand type ink-jet printer for jetting ink droplets from a nozzle has a plurality of pressure chambers interconnected with a single nozzle via a plurality of rectifying elements. The rectifying elements have a fluid resistance which is dependent on the direction of the fluid flow therethrough so that the pressure chambers can operate independent of one another to jet ink droplets at an increased frequency from the nozzle.

11 Claims, 31 Drawing Figures

PRINT HEAD FOR AN ON-DEMAND TYPE INK-JET PRINTER

BACKGROUND OF THE INVENTION

1. Field of the Invention

This invention relates to an ink-jet print head and more particularly to an on-demand type ink-jet print head.

2. Descirption of the Prior Art

Various ink-jet printers have been proposed. An on-demand type ink-jet print head is advantageous that the structure thereof in construction is a simple in construction and unnecessary ink droplets need not be recovered because the ink droplets are jetted in response to ink droplet information signals.

In the conventional on-demand type print head, however, the number of ink droplets that can be jetted per unit time (hereinafter referred to as the "droplet frequency") is smaller than other charge-control type ink-jet print heads and hence, the on-demand type print head is not suitable for high speed printing. Accordingly, a multi-nozzle system has been employed to increase the effective droplet frequency. However, when the multi-nozzle system is employed, the number of nozzles increases and the nozzles must be concentrated in a limited space.

SUMMARY OF THE INVENTION

It is therefore an object of the present invention to provide an ink-jet print head capable of producing ink droplets at a high droplet frequency.

It is another object of the present invention to provide an ink-jet printer which can be employed for high speed printing.

In accordance with the present invention, there is provided an ink-jet head comprising a nozzle; an ink supply passage; a plurality of pressure chamber; means for gathering ink flow passages from the pressure chambers and connecting them to the nozzle; and fluid control means di;posed in the ink flow passages for controlling the flow of the ink from the nozzle to the pressure chambers.

BRIEF DESCRIPTION OF THE DRAWINGS

Other features and advantages of the present invention will be apparent from the following description of preferred embodiments of the present invention in conjunction with the accompanying; drawings, wherein.

DESCRIPTION OF THE PREFERRED EMBODIMENT

Figure 1:
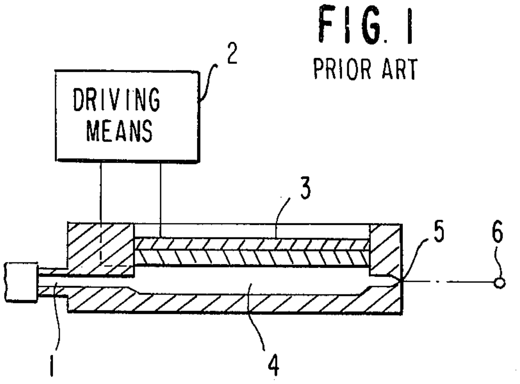
FIG. 1 PRIOR ART
FIG. 1 is a sectional view of a conventional on-demand type ink-jet print head.

First, referring to FIG. 1, a conventional type ink-jet print head consists of an ink supply passage 1 through which the ink is supplied from an ink tank (not shown), electro-mechanical transducer means 3 comprising a piezoelectric element which undergoes deformation in response to electric pulses from driving means 2, a pressure chamber 4 to which the electro-mechanical transducer means 3 is bonded and whose volume changes due to deformation, and a nozzle 5 for jetting the ink. The ink droplets are formed in this print head in the following three stages:

(1) The volume of the pressure chamber 4 decreases due to the electric pulse and the ink droplets 6 are jetted from the nozzle 5.

(2) After application of the electric pulse is completed, the volume of the pressure chamber returns to the original volume and the ink is retracted from the nozzle 5 as well as the ink supply passage 1 into the pressure chamber 4.

(3) The ink sucked into the nozzle returns to the nozzle end due to surface tension at the nozzle end.

Thus, the formation of ink droplets in the prior art print head can be divided into an ink jetting stage (1) and ink supply stages (2) and (3). Unless all of these stages (1), (2) and (3) are completed, subsequent droplet formation can not be effected. In the prior art print head, the upper limit of the droplet frequency is thus determined by the time required for these stages (1) through (3). In other words, if the subsequent droplet formation is effected, or if the operation of the stage (1) is effected, before the stages (2) and (3) are completed, the size and speed of the droplets would decrease or the jet of droplets itself would become impossible. Accordingly, the prior art print head requires a certain minimum amount of time for the ink to be supplied, droplet formation is not possible during this time period. This time period is equal to, or longer than, the ink jetting time for the stage (1). The ink supply time has been a major problem in increasing the droplet frequency.

Figure 2:
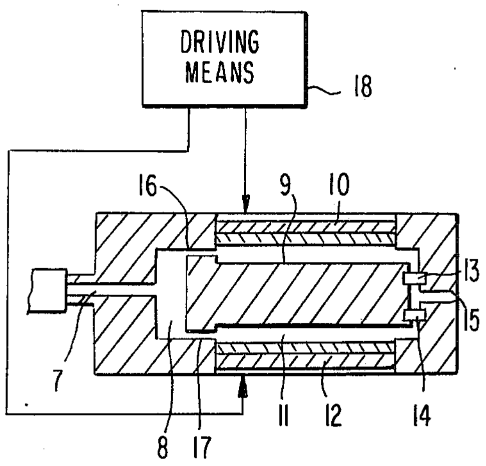
FIG. 2 is a sectional view of a first embodiment of the present invention.

Referring to FIG. 2, an ink-jet print head in accordance with a first embodiment of the present invention comprises an ink supply passage 7, an ink reservoir 8, first and second pressure chambers 9 and 11, first and second piezoelectric elements 10 and 12, first and second rectifying elements (fluid control means) 13 and 14 having fluid resistance depending upon the flowing direction of the ink, and a nozzle 15. A valve or a fluid diode may be used as the rectifying element and is disposed in the forward direction with respect to the ink flow to the nozzle 15. The flow passages from the rectifying elements all communicate with the nozzle 15.

The operation of this print head will now be described. When an electric pulse is applied from the driving means 18 to the first piezoelectric element 10, the internal pressure of the first pressure chamber 9 rises so that the ink therein is ejected from the first pressure chamber 9. In this case, since the first rectifying element 13 is biased in the forward direction, the ink flows toward the nozzle. A part of the ink flows toward the ink reservoir 8. The ink flowing toward the nozzle tries to flow towards the second pressure chamber 11, but is prevented because the second rectifying element 14 is biased in the reverse direction. Therefore, the ink passing through the first rectifying element 13 is jetted from the nozzle 15.

Next, when the application of the electric pulse is completed, the first pressure chamber 9 restores its original shape so that the pressure in the chamber 9 becomes negative and generates a suction force that sucks additional ink from an ink tank (not shown). Since the first rectifying element 10 is biased in the reverse direction in this case, the ink flow from the nozzle side is prevented and the ink flows into the pressure chamber from the ink supply side.

Thus, the suction of the ink into the nozzle after jetting is prevented due to the effects brought forth by the rectifying elements. Further, the pressure chamber 9 is communicated with the nozzle only at the time of ink jetting by the operation of the first rectifying element 10 and is kept separated from the nozzle 15 in the other state (during the ink supply or in the state in which no operation is effected).

The flow passages from the pressure chambers are gathered beofre they are connected to the nozzle, but mutual interference hardly occurs because they are operationally separated from one another by the rectifying elements. For this reason, there is no limitation at all to the timing of driving of the two pressure chambers 9 and 11.

The ink supply state is reestablished in the first pressure chamber 9 after the ink jet is ejected therefrom. If, in this instance, an electric pulse is applied to the second piezoelectric element 12, the ink is ejected from the second pressure chamber 11 in the same way as in the case of the first pressure chamber 9. The ink flows toward the nozzle 15 because the second rectifying element 14 is biased in the forward direction. In this case, since the first pressure chamber 9 is in the negative pressure state and the ink flow from the nozzle side to the first pressure chamber 9 is prevented by the first rectifying element 13, all the ink that flows out from the second pressure chamber 11 towardsthe nozzle is jetted from the nozzle.

Thus, the ink can be jetted from one pressure chamber even when the other pressure chamber has jetted the ink and hence, is under the ink supply state. This operation can be accomplished only by incorporating the rectifying elements 13,14. If the rectifying elements are not used, the ink that is ejected from one pressure chamber would flow into the other pressure chamber so that the ink droplets would not be jetted from the nozzle, or even if it ink droplets were jetted, the jet efficiency would become extremely low and could not be used practically.

Even when an electric pulse is applied to one piezoelectric element after an electric pulse has been applied to the other piezoelectric element but the application has not yet been completed, no problem occurs, in particular, to the droplet formation. The ink droplets jetted in this instance are either separate droplets or continuous droplets depending upon the overlap of the two electric pulses with respect to time.

Figure 3A:
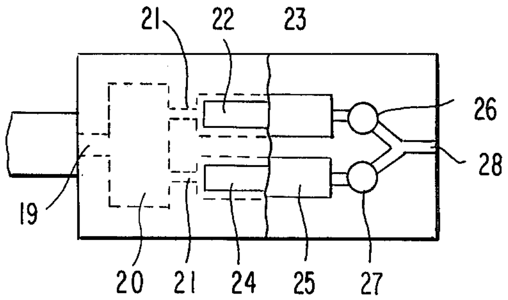
FIGS. 3(*a*) through 3(*c*) and 5 show other embodiments of the present invention.
Figure 3B:
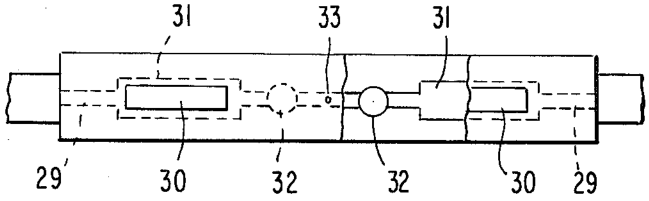
Figure 3C:
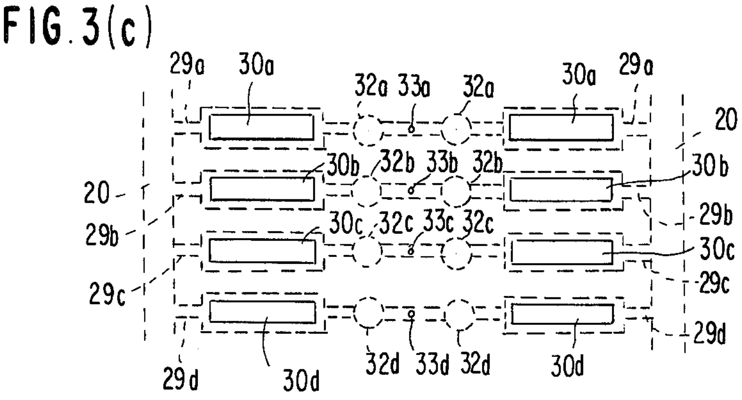

FIGS. 3(*a*) to 3(*c*) show second to fourth embodiments of the present invention. The second embodiment shown in FIG. 3(*a*) comprises an ink supply passage 19, an ink reservoir 20, pressure chambers 22 and 24, piezoelectric elements 23 and 25, fluid control means 26 and 27, and a nozzle 28. In the second embodiment shown in FIG. 3(*a*) the pressure chambers 22 and 24 are disposed horizontally, while the pressure chambers 9 and 11 are vertically disposed. The horizontal disposition of the pressure chambers simplifies the construction when compared with the vertical disposition and provides greater freedom for disposing the pressure chambers. The horizontal disposition is more advantageous when three of more sets of pressure chambers and rectifying elements are employed. If the number of pressure chambers is increased in this manner, the droplet frequency can be increased as much.

The third embodiment shown in FIG. 3(*b*) comprises piezoelectric elements 30, pressure chamber 31, fluid control means 32, and a nozzle 33. The nozzle 33 is formed perpendicularly to the plane on which the pressure chambers 31 are formed, and the pressure chambers and the rectifying elements 32 are disposed on the right and left with respect to the nozzle as the center.

This arrangement makes it possible to dispose a plurality of nozzles 33*a*–33*d* in high density when a multinozzle configuration is employed as shown in FIG. 3(*c*).

Figure 4A:
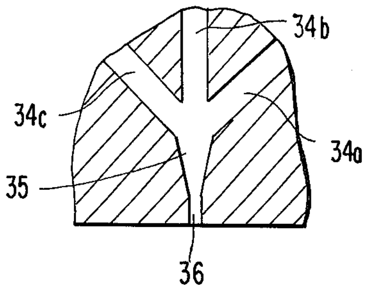
FIGS. 4(*a*) and 4(*b*) are schematic sectional views useful for explaining the connection method of the flow passages from rectifying elements to the nozzle.
Figure 4B:
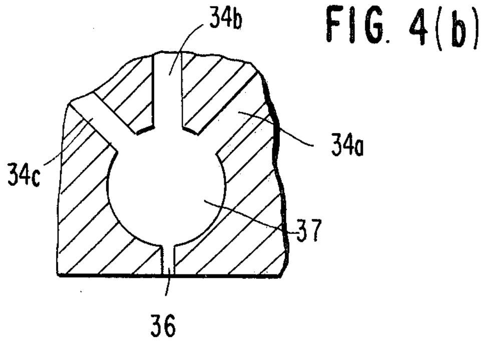

In the above embodiments, there is no limitation, in particular, to the method of connecting the flow passage from each rectifying element to the nozzle, but it is preferred that the fluid resistance from each pressure chamber to the nozzle including each rectifying element be equal. For example, as shown in FIG. 4(*a*), it is possible to use a connection method in which the flow passages 34*a*, 34*b*, 34*c* from the rectifying elements are gathered in one flow passage 35, which is then connected to the nozzle 36. It is also possible to use another connection method in which the flow passages 34*a*, 34*b*, 34*c* are connected to the ink chamber 37, which is then connected to the nozzle 36, as shown in FIG. 4(*b*).

It is possible to enhance the effect of the present invention by disposing a rectifying element in the flow passage of the ink supply side. In the above embodiments, the ink ejected from the pressure chamber at the time of jetting of droplets flows out not only towards the nozzle but also towards the ink supply side. Accordingly, it is required that the volume displacement of the piezoelectric element is greater than the droplet volume. Furthermore, the pressure is transmitted to the other pressure chamber through the ink reservoir 8 and piping arrangement resulting interference. Hence, the fluid resistance of the flow passages 16 and 17 and the structure of the ink reservoir 8 must be taken into account.

Figure 5:
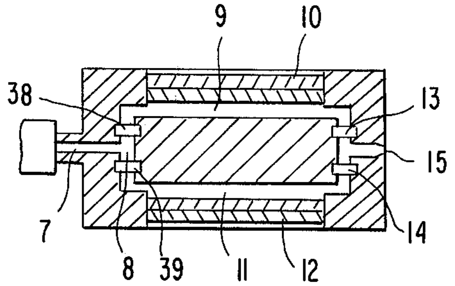

In an embodiment shown in FIG. 5, the rectifying elements 38 and 39 are incorporated in the flow passage of the ink supply side in the forward direction. Therefore, each pressure chamber is communicated with the ink reservoir 8 and the ink supply passage 7 only when the ink is sucked, and the chamber is kept cut off from them at other times. Thus, mutual interference between the pressure chambers through the ink reservoir and the ink supply passage is eliminated. In addition, this embodiment substantially eliminates the flow of ink towards the ink supply side when the droplets are jetted, so that the efficiency of the piezoelectric element can be improved.

Figure 6:
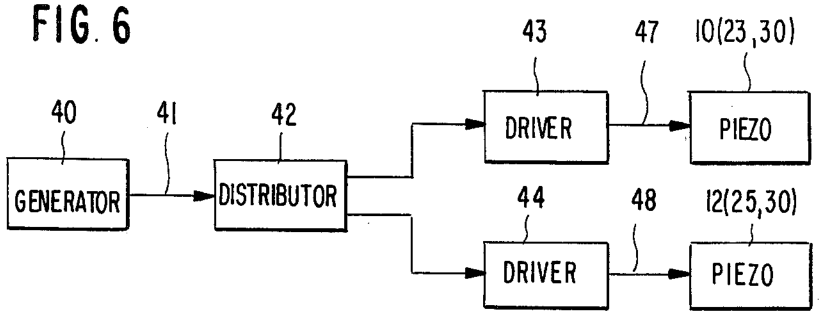
FIGS. 6 and 12 are block diagrams of drivers for the ink-jet print heads according to the present invention.

Referring to FIG. 6, a driver for the print head according to the embodiments of the present invention comprises a generator 40 for generating a droplet formation signal in accordance with a picture signal, a signal distributor 42, and piezo-driving circuits 43 and 44 for driving the piezoelectric elements 10 and 12.

When printing is carried out, the droplet formation signal 41 is produced from the generator 40 in accordance with the picture information. The frequency of the droplet formation signal is restricted below the response frequency of the ink-jet print head to be employed. In the case where the response frequency for the ink-jet print head having one pressure chamber is $f_{max}$, the response frequency is N times $f_{max}$ when N pressure chambers are used. When the droplet formation signal 41 is applied to the signal distributor 42 to be distributed to the piezo-driving circuits 43 and 44, the driving pulses 47 and 48 are applied to the piezoelectric elements 10 and 12, respectively. The signal distributor 42 restricts the maximum frequency of the droplet formation signal to be applied to one piezo-driving circuit to the response frequency $f_{max}$ for one pressure chamber.

Figure 7:
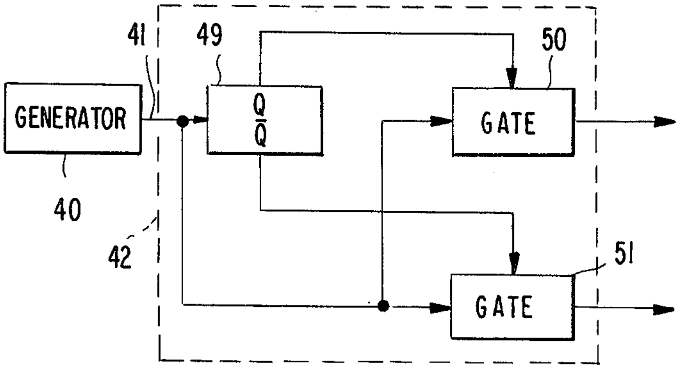
FIGS. 7, 9 and 10 are block diagrams of examples of signal distributors.

FIG. 7 shows an example of the signal distributor 42. The distributor 42 comprises a flip-flop circuit 49 whose state is reversed at the trailing of the droplet formation signal 41, and AND gates 50 and 51. When applied from the generator 40 thereto, the droplet formation signals 41 are alternatively applied to the driving circuits 43 and 44 by means of the AND gates 50 and 51.

The operation of the driver will be described with reference to FIG. 8. It is assumed that the output Q of the flip-flop circuit 49 is at a high level, and the AND gate 50 is in an open state. The first droplet formation signal 101 (FIG. 8(*a*)) is applied through the AND gate 50 to the driving circuit 43 as shown in FIG. 8(*b*), whereby the driving signal 301 is produced as shown in FIG. 8(*c*).

Then, the flip-flop circuit 49 is reversed by the trailing edge of the droplet formation signal 101, whereby the output $\overline{Q}$ of the flip-flop circuit 49 becomes to high level and the AND gate 51 becomes to open state. The second droplet formation signal 102 is applied through the AND gate 51 to the driving circuit 44 as shown in FIG. 8(*d*), whereby the driving signal 302 (FIG. 8(*e*)) is produced. Then, the flip-flop is again inverted by the trailing edge of the droplet formation signal. In this manner, the droplet formation signal is alternately distributed to the driving circuits 43 and 44.

Figure 8:
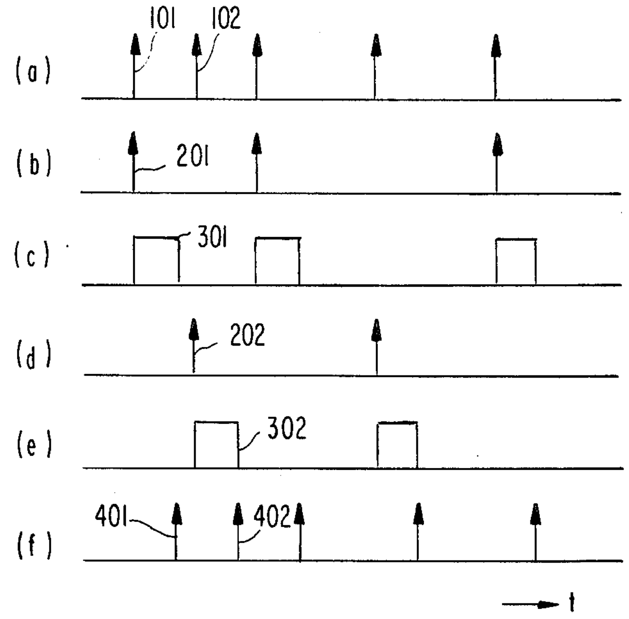
FIGS. 8(*a*) through 8(*f*), 11(*a*) through 11(*d*) and 13(*a*) through 13(*g*) are timing charts.

The driving pulses 301 and 302 are applied from the driving circuits 43 and 44 to the piezoelectric elements 10 and 12, whereby the ink droplets 401 and 402 are generated, respectively, as shown in FIG. 8(*f*).

Figure 9:
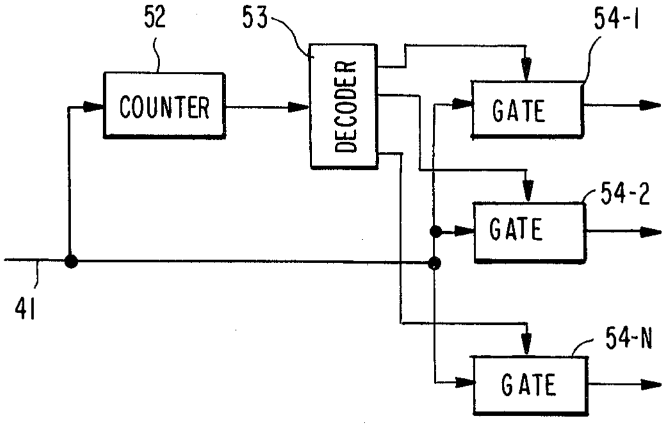

In case where three or more pressure chambers are used, a counter and a decoder may be employed instead of the flip-flop circuit. For example, as shown in FIG. 9, a counter 52 that counts the number N of the driving circuits and returns then to the initial value, and a decoder 53 are employed in place of the flip-flop circuit. The output of the decoder 53 is applied to AND gates 54-1 through 54-N. Whenever the droplet formation signal is applied, the high level output end of the decoder moves and in accordance therewith, the gate that is to be open also moves, thus sequentially distributing the droplet formation signal 41.

Figure 10:
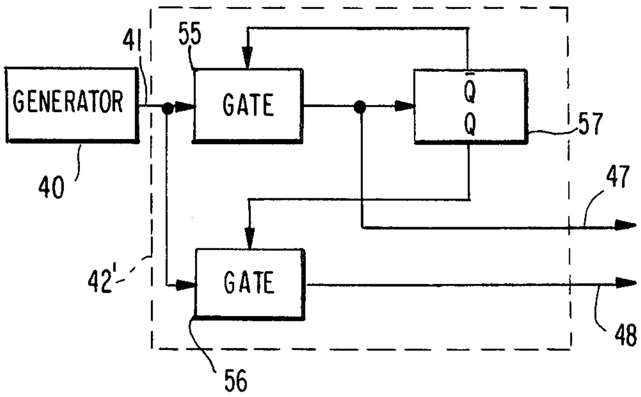
Figure 11:
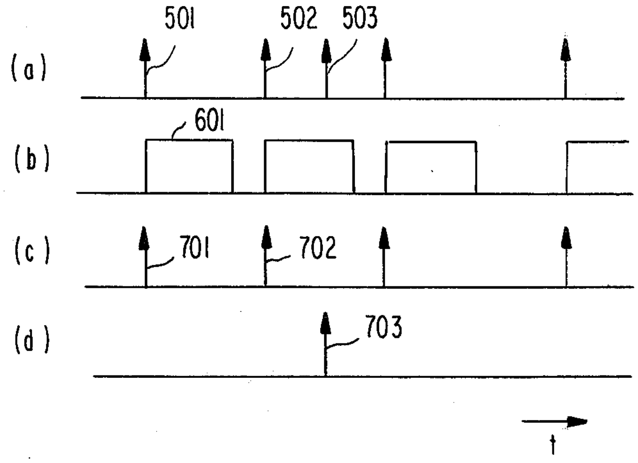

FIG. 10 shows another example 42' of the signal distributor. This example comprises AND gates 55 and 56, and a mono-stable multivibrator 57. When the pulse pitch of the droplet formation signal is longer than a predetermined period of time, the droplet formation signal is distributed to the first driving circuit, and when it is shorter than the predetermined period of time, the droplet formation signal is withdrawn. When the pulse pitch of the droplet formation signal thus withdrawn is longer than the above-mentioned predetermined period of time, the signal is applied to the second driving circuit and when it is shorter, it is again withdrawn. The above-mentioned predetermined period of time is hereby selected so as to correspond to the shortest response time when the ink droplet is formed by one pressure chamber. The time constant of the monostable multivibrator 57 is set to the above-mentioned predetermined period of time. The operation will be described with reference to FIGS. 10 and 11. The output $\overline{Q}$ of the monostable multivibrator 57 is applied to the gate 55 with the output Q being applied to the gate 56. Under the steady state, the gate 55 is open and the gate 56 is closed. When applied, the droplet formation signal 501 passes through the gate 55 and a droplet formation signal 601 is applied to the driving circuit 43. The signal passed through the gate 55 is also applied to the monostable multivibrator 57 to produce a pulse 601 having a predetermined pulse width. If the droplet formation signal 502 is applied with a pulse pitch to the signal 501 longer than the predetermined period of time, the multivibrator has already returned to the stable state so that it performs the same operation as before and the droplet formation signal 702 is applied to the driving circuit 43. In case where the droplet formation signal 503 whose pulse pitch to the signal 502 is shorter than the predetermined period of time, the multivibrator 57 is yet under the inverted state so that the gate 55 is closed while the gate 56 is opened. Accordingly, the droplet formation signal 703 is applied to the driving circuit 44. Thus, the droplet formation signal having the pulse pitch shorter than the predetermined period of time is not applied to a single driving circuit.

In case where N number of pressure chambers are employed, (N−1) number of circuits 42' are employed with the output of the gate 56 being used as the input signal to the next stage.

Figure 12:
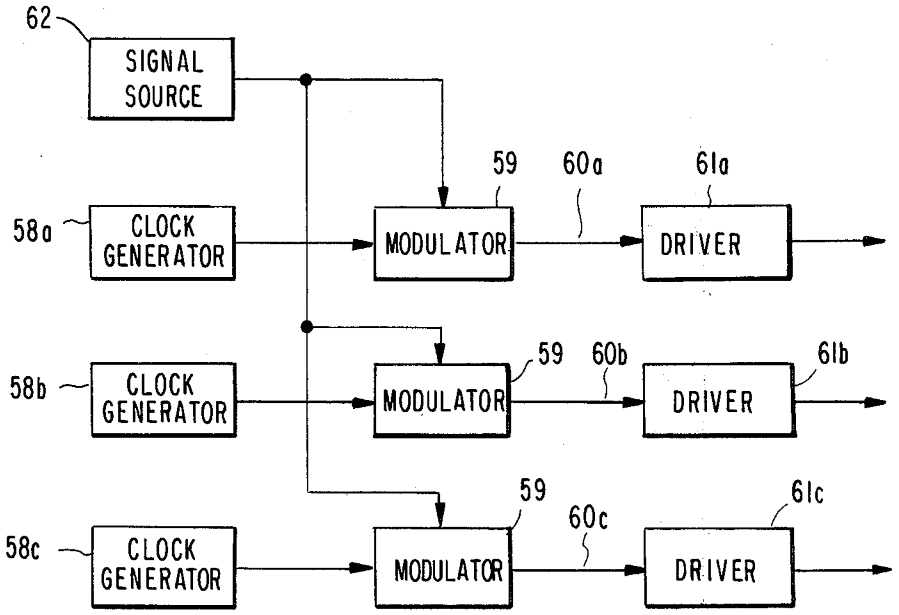

Referring to FIG. 12, another example of the driver for driving the print head having three pressure chambers, comprises clock signal generators 58*a* to 58*c* for producing clock signals of a predetermined frequency as shown in FIGS. 8(*a*) to 8(*c*); a picture signal source 62; modulators 59 for modulating the clock signals by the picture signal and producing the droplet formation signals 60*a* to 60*c*; and driving circuits 61*a* to 61*c*. The frequency of the clock signal is set below the response frequency for one pressure chamber. In order to stably form the droplets by equalizing the condition for the droplet formation by the pressure chambers, it is preferred that the phase difference between the clock signals is equal to one another. When a head having three pressure chambers is used, for example, the phase must be deviated by 120 degrees.

Figure 13:
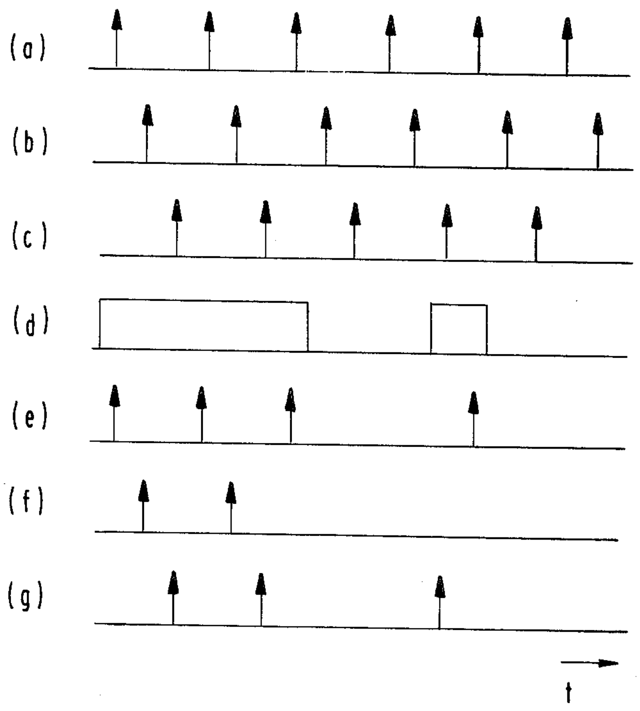

FIG. 13 shows a timing chart. The clock signals shown in FIGS. 13(*a*) through 13(*c*) are modulated by picture signals (FIG. 13(*d*)) in modulators 59 to obtain droplet formation signals as shown in FIGS. 13(*e*) through 13(*g*), and these signals are applied to the driving circuits to obtain the electric pulses.

It is possible to use those signals which have the same waveform as that of the electric pulses for driving the piezoelectric elements (square wave, sine wave or the like) as the clock signals so as to modulate their amplitude by the picture signals and to apply the output signals to the piezoelectric elements after the output signals are amplified by an amplifier to such a level at which they can drive the piezoelectric elements.

Figure 14:
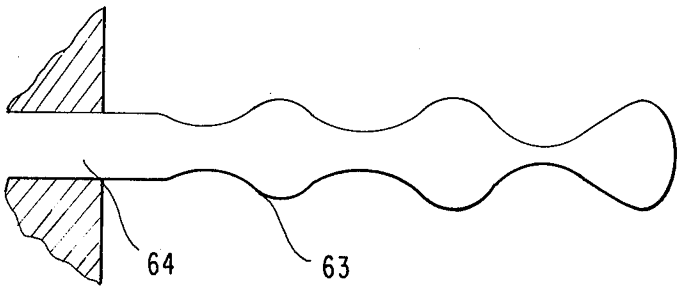
FIG. 14 is a schematic view showing the behavior of the ink ejected from the nozzle.

In the foregoing description, when the droplets are to be formed continuously by the maximum droplet frequency, a plurality of pressure chambers are sequentially driven by any driving means. In this case, if the width of the voltage pulses to be applied to the piezoelectric element of each pressure chamber is expanded, the ink 63 ejected from the nozzle 64 becomes continuous without separation, as shown in FIG. 14. The constriction of such a jet becomes greater as it comes away from the nozzle and separates. When printing on the paper is made by jetting the ink at the maximum droplet frequency so that the ink becomes continuous, the printing does not separate into dots and hence, the quality of the picture produced can be improved.

As described in the foregoing, the present invention provides the ink-jet print head which includes a plurality of pressure chambers and in which each pressure chamber is connected to the common nozzle via the rectifying element. In this head, the pressure chambers are separated from one another. Even when one of the pressure chambers is under the ink supply state, an ink droplet can be formed by the other pressure chambers. When the head has N pressure chambers, its response frequency becomes N times that of the head having only one pressure chamber. Hence, the ink-jet printer having a high response frequency can be obtained.

What is claimed is:

1. A print head for an on-demand type ink-jet printer for jetting ink droplets on a printing medium, said print head comprising:

a plurality of pressure chambers filled with ink;

a plurality of pressure exertion means for exerting pressures on said ink filled in said pressure chambers in response to driving signals;

a nozzle for jetting said ink droplets;

means for communicating said pressure chambers with said nozzle; and a plurality of first fluid control means disposed in ink passages between said pressure chambers and said nozzle for controlling the flow of ink in response to the ink pressure.

2. The print head as claimed in claim 1 further comprising an ink supply passage for supplying said ink from an ink tank to said pressure chambers; and a plurality of second fluid control means disposed in said ink supply passage between said pressure chambers and said ink supply passage for controlling the flow of ink in response to the ink pressure.

3. The print head as claimed in claim 1 or 2, wherein said pressure chambers are vertically disposed.

4. The print head as claimed in claim 1 or 2, wherein said pressure chambers are horizontally disposed.

5. The print head as claimed in claim 1 or 2, wherein said nozzle is disposed perpendicularly to a plane on which said pressure chambers are disposed.

6. An on-demand type ink-jet printer for printing by jetting ink droplets on a printing medium, said printer comprising:

an ink-jet head including a plurality of pressure chambers filled with ink; a plurality of pressure exertion means for exerting pressures on said ink filled in said pressure chambers in response to driving signals; a nozzle for jetting said ink droplets; means for communicating said pressure chambers with said nozzle; and a plurality of first fluid control means disposed in ink passages between said pressure chambers and said nozzle for controlling the flow of ink in response to the ink pressure; and print head driving means for producing said driving signals in response to information signals representative of information to be printed.

7. The printer as claimed in claim 6, wherein said print head driving means includes a plurality of driver circuits for producing said driving signals, and means for distributing said information signals to said driver circuits.

8. The printer as claimed in claim 7, wherein said distributing means includes a flip-flop circuit to which said information signals are applied, and a plurality of gate means for gating said information signals in response to the outputs of said flip-flop circuit.

9. The printer as claimed in claim 7, wherein said distributing means includes a counter for counting said information signals, a decoder for decoding the content of said counter, and a plurality of gate means responsive to the outputs of said decoder for selectively gating said information signals.

10. The printer as claimed in claim 7, wherein said distributing means includes a plurality of AND gates and a monostable multivibrator, the output of one of said AND gates being applied to said monostable multivibrator, said AND gates being controlled by the output of said monostable multivibrator.

11. The printer as claimed in claim 6, wherein said print head driving means includes:

means for producing a plurality of clock pulses, phases of said clock pulses being different from each other;

means for modulating said clock pulses by said information signals to produce a plurality of modulated clock pulses; and a plurality of driver circuits responsive to said modulated clock pulses for producing said driving signals.

* * * * *

UNITED STATES PATENT AND TRADEMARK OFFICE

CERTIFICATE OF CORRECTION

PATENT NO. : 4,435,721

DATED : March 6, 1984

INVENTOR(S) : Tsuzuki et al

It is certified that error appears in the above-identified patent and that said Letters Patent are hereby corrected as shown below:

Column 1, line 14, delete "in construction", "a" and "in construc-",
line 15, delete "ion",
line 38, after "ink-jet" insert --print
line 60, change "the" to --a--;

line 38, before "droplet" insert --and--;

Column 3, line 12, after "the" insert --first--,
line 19, change "beofre" to --before--,
line 37, change "towardsthe" to --towards the--,
line 41, change "under" to --in--;

Column 4, line 8, change "chamber" to --chambers--,
line 40, after "resulting" insert --in--,

Signed and Sealed this

*Second* Day of *October 1984*

[SEAL]

*Attest:*

GERALD J. MOSSINGHOFF

*Attesting Officer* *Commissioner of Patents and Trademarks*